(12) United States Patent
Hashimoto et al.

(10) Patent No.: US 7,553,565 B2
(45) Date of Patent: Jun. 30, 2009

(54) MAGNETIC RECORDING MEDIUM

(75) Inventors: Hiroshi Hashimoto, Kanagawa (JP); Yuichiro Murayama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 619 days.

(21) Appl. No.: 11/175,170

(22) Filed: Jul. 7, 2005

(65) Prior Publication Data

US 2006/0008681 A1 Jan. 12, 2006

(30) Foreign Application Priority Data

Jul. 8, 2004 (JP) ............... 2004-201653

(51) Int. Cl.
*G11B 5/708* (2006.01)
(52) U.S. Cl. ................... 428/843; 428/840.1
(58) Field of Classification Search .............. 428/840.2, 428/840.1, 842.2, 844.2, 843, 843.4, 839.5, 428/838, 840, 840.5, 840.6, 842.1, 843.1, 428/843.2, 843.3, 843.7, 844.5, 844.7
See application file for complete search history.

(56) References Cited

U.S. PATENT DOCUMENTS

| | | | |
|---|---|---|---|
| 6,517,942 B1 * | 2/2003 | Ono et al. ................. | 428/425.9 |
| 2003/0108773 A1 * | 6/2003 | Matsubaguchi et al. ..................... | 428/694 BU |
| 2004/0219352 A1 * | 11/2004 | Harasawa et al. ........... | 428/329 |

FOREIGN PATENT DOCUMENTS

| | | |
|---|---|---|
| JP | 9-212847 A | 8/1997 |
| JP | 2001-338414 A | 12/2001 |

* cited by examiner

*Primary Examiner*—Holly Rickman
*Assistant Examiner*—Lisa Chau
(74) *Attorney, Agent, or Firm*—Sughrue Mion, PLLC

(57) ABSTRACT

A magnetic recording medium is provided that includes a support and at least one magnetic layer provided on or above the support, the magnetic layer including a ferromagnetic powder dispersed in a binder and at least one type of compound selected from Formulae (I) to (III) below;

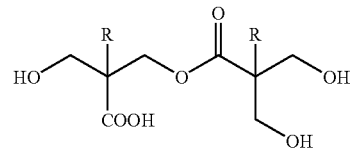

(I)

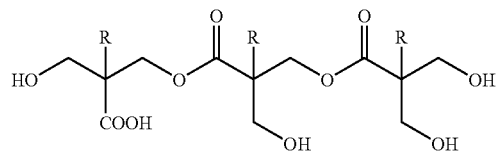

(II)

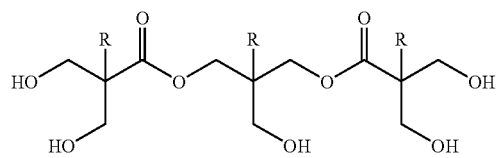

(III)

(in Formulae (I) to (III), each R independently denotes an alkyl group having 1 to 20 carbons).

15 Claims, No Drawings

MAGNETIC RECORDING MEDIUM

BACKGROUND OF THE INVENTION

Field of the Invention

The present invention relates to a magnetic recording medium for high density recording, the medium comprising a ferromagnetic powder in a magnetic layer.

In general, with the demand for higher recording density of magnetic recording media for computer use, etc., it is necessary to yet further improve electromagnetic conversion characteristics, and it is important to make the ferromagnetic powder finer, the surface of the medium ultra smooth, etc.

With regard to finer magnetic substances, a recent magnetic substance employs a ferromagnetic metal powder of 0.1 μm or less or a ferromagnetic hexagonal ferrite powder having a plate size of 40 nm or less. In the case of a multilayer structure in which a magnetic layer is provided as an upper layer above a nonmagnetic lower layer provided on the surface of a support, in order to highly disperse a nonmagnetic powder used for the nonmagnetic layer or the magnetic substance a magnetic recording medium has been proposed that comprises a polycarboxylic acid or an anhydride thereof having a molecular weight of equal to or less than 300 in a magnetic layer (ref. JP-A-9-212847; JP-A denotes a Japanese unexamined patent application publication). There has also been proposed a magnetic recording medium comprising an organophosphorous compound in a magnetic layer (ref. JP-A-2001-338414).

BRIEF SUMMARY OF THE INVENTION

It is an object of the present invention to provide a magnetic recording medium having excellent electromagnetic conversion characteristics, dispersibility, durability, and storage stability.

The object of the present invention has been attained by (1) and (2) below.

(1) A magnetic recording medium comprising a support and at least one magnetic layer provided above the support, the magnetic layer comprising a ferromagnetic powder dispersed in a binder and at least one type of compound selected from Formulae (I) to (III) below;

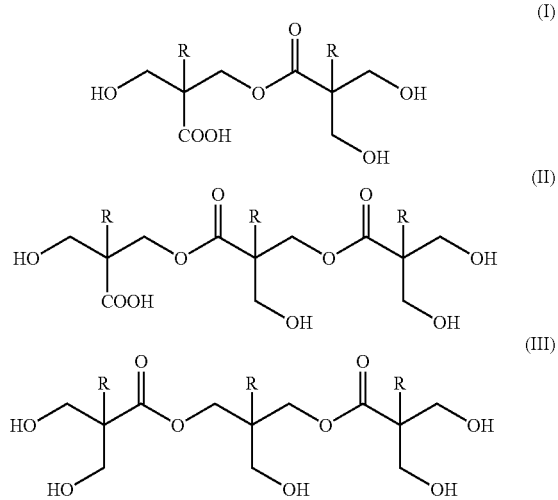

(in Formulae (I) to (III), each R independently denotes an alkyl group having 1 to 20 carbons).

(2) A magnetic recording medium comprising a support, a nonmagnetic layer provided above the support, the nonmagnetic layer comprising a nonmagnetic powder dispersed in a binder, and at least one magnetic layer provided above the nonmagnetic layer, the magnetic layer comprising a ferromagnetic powder dispersed in a binder, and the nonmagnetic layer and/or the magnetic layer comprising at least one type of compound selected from Formulae (I) to (III) below;

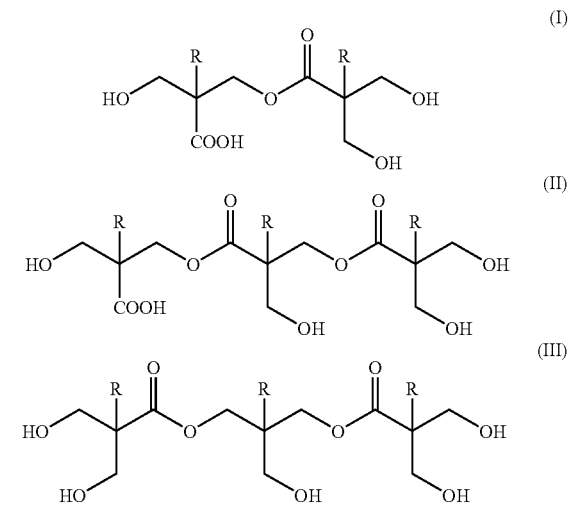

(in Formulae (I) to (III), each R independently denotes an alkyl group having 1 to 20 carbons).

BEST MODE FOR CARRYING OUT THE INVENTION

The magnetic recording medium of the present invention comprises at least one type of compound selected from Formulae (I) to (III) below;

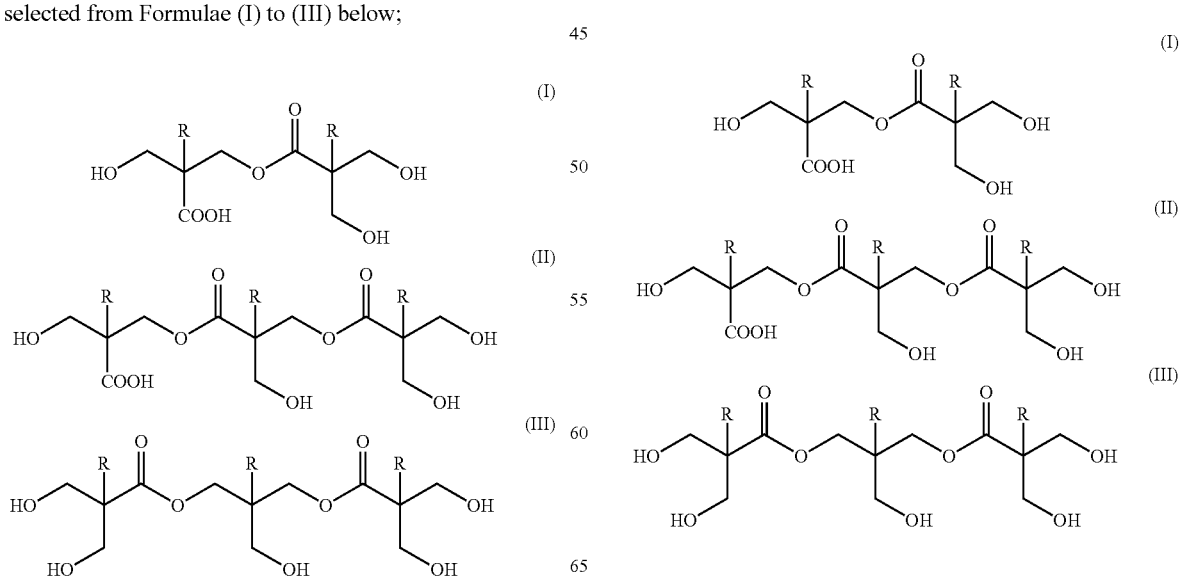

(in Formulae (I) to (III), each R independently denotes an alkyl group having 1 to 20 carbons).

R is preferably a lower alkyl group having 1 to 6 carbons, more preferably a lower alkyl group having 1 to 3 carbons, yet more preferably methyl, ethyl, or propyl, and most preferably methyl or ethyl.

The compound represented by Formulae (I) to (III) is a dimer or a trimer of an α,α-dimethylolalkanoic acid and can be obtained by dimerization or trimerization of 2,2-dimethylolacetic acid, 2,2-dimethylolpropionic acid, 2,2-dimethylolbutyric acid, 2,2-dimethylolpentanoic acid, etc. The α,α-dimethylolalkanoic acid here may be a metal salt, and examples thereof include an alkali metal salt such as a sodium salt of an α,α-dimethylolalkanoic acid.

These compounds may be obtained by a known dehydration-condensation reaction of an α,α-dimethylolalkanoic acid, followed by separation and purification, but this should not be construed as being limiting.

The compound represented by Formulae (I) to (III) adsorbs on the surface of a ferromagnetic powder or a nonmagnetic inorganic powder, which are fine particles, exhibits a high degree of dispersion, can suppress any increase in the coating viscosity, and can therefore give a very smooth coating.

Because of this, it can of course be applied to the magnetic layer, but when it is applied to a nonmagnetic layer of a magnetic recording medium having a magnetic layer provided on a support via the nonmagnetic lower layer, a very smooth surface can be obtained, and a high degree of electromagnetic conversion characteristics can be achieved.

Since the compound represented by Formulae (I) to (III) has a COOH group and an OH group in the molecule, the interaction between the surface of a ferromagnetic powder and a binder or a polyisocyanate curing agent can be improved very effectively, and the mechanical strength and the durability of the coating can be improved.

The magnetic recording medium comprising the compound represented by Formulae (I) to (III) exhibits little increase in friction and the surface is resistant to scraping.

When the compound represented by Formulae (I) to (III) is added to the magnetic layer, it is preferably added at 0.1 to 15 parts by weight relative to 100 parts by weight of ferromagnetic powder.

When the compound represented by Formulae (I) to (III) is added to the nonmagnetic layer, it is preferably added at 0.1 to 15 parts by weight relative to 100 parts by weight of nonmagnetic powder.

In the magnetic recording medium of the present invention, it is preferable that the number of magnetic layer surface micro projections having a height measured by atomic force microscopy (AFM) of 10 to 20 nm is 5 to 1,000 per 100 $(\mu m)^2$ of the surface of the magnetic layer, and more preferably 5 to 100 per 100 $(\mu m)^2$.

The height measured by atomic force microscopy (AFM) referred to here is defined as the height obtained using as a reference plane a center plane determined by atomic force microscopy (plane for which the volume enclosed by a magnetic layer surface roughness curve and the plane is equal above and below the plane and is a minimum).

Therefore, the number of projections (hereinafter, also called PN) having a height of 10 to 20 nm per 100 $(\mu m)^2$ of the surface of the magnetic layer means the density of projections, as the total number per 10 μm square, having a height relative to the reference surface of 10 to 20 nm.

When the PN is in the above-mentioned range, not only are the transport characteristics excellent, but also the strength of the magnetic layer is high even under repetitive transport, There is little reduction in the projections due to the surface being scraped off, and the transport durability is excellent.

Binder

The magnetic recording medium of the present invention can employ, as a binder for the magnetic layer and the nonmagnetic layer, a cellulose resin such as nitrocellulose, cellulose acetate, or cellulose propionate, a polyvinyl alkyral resin such as polyvinyl acetal or polyvinyl butyral, an acrylic resin, a phenoxy resin, a polyester resin, a polyurethane resin, a vinyl chloride resin, etc.

These resins may be known ones.

For both the magnetic layer and the nonmagnetic layer, a binder described in JP-A-10-222838 may be used as the binder.

Although not particularly limited, it is preferable to use a polyurethane binder since it has a high affinity for compounds represented by Formulae (I) to (III) used in the present invention.

Examples of the polyurethane include polyester urethane, polyether urethane, polycarbonate urethane, polyether ester urethane, and acrylic polyurethane.

The glass transition temperature (Tg) of the polyurethane is preferably −50° C. to +200° C., and more preferably 30° C. to 150° C. If the glass transition temperature is in the above-mentioned range, since the durability is good and the calender moldability is not degraded, the smoothness and the electromagnetic conversion characteristics are good.

The vinyl chloride binder may be a copolymer of vinyl chloride with an acrylic or methacrylic monomer such as an alkyl acrylate or an alkyl methacrylate, an allyl ether such as an allyl alkyl ether, a fatty acid vinyl ester such as vinyl acetate or vinyl propionate, a vinyl monomer such as styrene, ethylene, or butadiene, a monomer having a functional group such as a hydroxyl group or an epoxy group, or a monomer having a polar group described below.

The binder preferably has incorporated therein $1 \times 10^{-5}$ eq/g to $2 \times 10^{-4}$ eq/g of a polar group such as —COOM, —SO$_3$M, —SO$_4$M, —PO(OM)$_2$, —OPO(OM)$_2$, an amino group, or a quaternary ammonium salt group. M denotes a hydrogen atom or an alkali metal such as Na or K. When the amount of polar group incorporated is in the above-mentioned range, the dispersibility is good.

In addition, it is preferable to add, as a curing functional group, a compound having an OH group, which reacts with an isocyanate curing agent, or an epoxy group. It is preferable if this compound has an affinity for the OH group or the —COOH group of the compounds represented by Formulae (I) to (III) of the present invention, or if there is potential for reaction of the OH group with the isocyanate curing agent.

It is preferable to add as a curing agent a polyisocyanate compound or an epoxy compound, and particularly preferably a polyisocyanate compound. A known polyisocyanate compound may be used.

The amount of binder, including the curing agent, in the magnetic layer is preferably 5 to 25 parts by weight relative to 100 parts by weight of the ferromagnetic powder. The amount of binder in the nonmagnetic layer is preferably 10 to 30 parts by weight relative to 100 parts by weight of the nonmagnetic powder.

Ferromagnetic Powder

The magnetic recording medium of the present invention may employ as a ferromagnetic powder an acicular ferromagnetic substance or a tabular magnetic substance described below.

Ferromagnetic Iron Oxide or Ferromagnetic Metal Powder

One form of the ferromagnetic powder used in the magnetic recording medium of the present invention is acicular, and examples thereof include a cobalt-containing ferromagnetic iron oxide or a ferromagnetic alloy powder.

The specific surface area measured by the BET method (hereinafter, SBET means a specific surface area measured by the BET method) is preferably 40 to 80 $m^2/g$, and more preferably 50 to 70 $m^2/g$.

The length of the major axis is preferably 20 to 200 nm, and more preferably 25 to 60 nm.

The length of the major axis is determined by the combined use of a method in which a transmission electron microscope photograph is taken and the length of the minor axis and the length of the major axis of the ferromagnetic metal powder are measured directly therefrom, and a method in which a transmission electron microscope photograph is traced by an IBASSI image analyzer (manufactured by Carl Zeiss Inc.) and read off.

The crystallite size is preferably 5 to 25 nm, more preferably 8 to 20 nm, and particularly preferably 10 to 15 nm.

The crystallite size is an average value obtained by the Scherrer method from a half-value width of a diffraction peak obtained using an X-ray diffractometer (RINT2000 series, manufactured by Rigaku Corporation) with a CuK$\alpha$1 radiation source, a tube voltage of 50 kV, and a tube current of 300 mA.

Examples of the ferromagnetic powder include yttrium-containing Fe, Fe—Co, Fe—Ni, and Co—Ni—Fe. The yttrium content in the ferromagnetic powder is preferably 0.5 to 20 atom % as the yttrium atom/Fe atom ratio Y/Fe, and more preferably 5 to 10 atom %. It is preferable if the yttrium content is in such a range since the ferromagnetic powder has a high $\sigma s$ value. Since the content of iron also becomes an appropriate level, it is possible to obtain good magnetic properties and electromagnetic conversion characteristics.

Furthermore, it is also possible for aluminum, silicon, sulfur, scandium, titanium, vanadium, chromium, manganese, copper, zinc, molybdenum, rhodium, palladium, tin, antimony, boron, barium, tantalum, tungsten, rhenium, gold, lead, phosphorus, lanthanum, cerium, praseodymium, neodymium, tellurium, bismuth, etc. to be present at 20 atom % or less relative to 100 atom % of iron. It is also possible for the ferromagnetic metal powder to contain a small amount of water, a hydroxide, or an oxide.

The form of the ferromagnetic metal powder may be any of acicular, granular, rice-grain shaped, and tabular as long as the above-mentioned requirements for the particle size are satisfied, but it is particularly preferable to use an acicular ferromagnetic metal powder. In the case of the acicular ferromagnetic metal powder, the acicular ratio is preferably 4 to 12, and more preferably 5 to 12.

The coercive force (Hc) of the ferromagnetic metal powder is preferably 159 to 239 kA/m (2,000 to 3,000 Oe), and more preferably 167 to 231 kA/m (2,100 to 2,900 Oe). The saturation magnetic flux density is preferably 100 to 300 mT (1,000 to 3,000 G), and more preferably 160 to 280 mT (1,600 to 2,800 G). The saturation magnetization ($\sigma s$) is preferably 100 to 170 $A \cdot m^2/kg$ (emu/g), and more preferably 100 to 160 $A \cdot m^2/kg$ (emu/g).

The SFD (switching field distribution) of the ferromagnetic powder itself is preferably low, and 0.8 or less is preferred. When the SFD is 0.8 or less, the electromagnetic conversion characteristics become good, the output becomes high, the magnetization reversal becomes sharp with a small peak shift, and it is suitable for high-recording-density digital magnetic recording. In order to narrow the Hc distribution, there is a technique of improving the particle distribution of goethite, a technique of using monodispersed $\alpha$-$Fe_2O_3$, and a technique of preventing sintering between particles, etc. in the ferromagnetic metal powder.

One example of a process for producing the ferromagnetic powder of the present invention, into which cobalt or yttrium has been introduced, is illustrated below.

For example, an iron oxyhydroxide obtained by blowing an oxidizing gas into an aqueous suspension in which a ferrous salt and an alkali have been mixed can be used as a starting material. This iron oxyhydroxide is preferably of the $\alpha$-FeOOH type, and with regard to a production process therefor, there is a first production process in which a ferrous salt is neutralized with an alkali hydroxide to form an aqueous suspension of $Fe(OH)_2$, and an oxidizing gas is blown into this suspension to give acicular $\alpha$-FeOOH. There is also a second production process in which a ferrous salt is neutralized with an alkali carbonate to form an aqueous suspension of $FeCO_3$, and an oxidizing gas is blown into this suspension to give spindle-shaped $\alpha$-FeOOH. Such an iron oxyhydroxide is preferably obtained by reacting an aqueous solution of a ferrous salt with an aqueous solution of an alkali to give an aqueous solution containing ferrous hydroxide, and then oxidizing this with air, etc. In this case, the aqueous solution of the ferrous salt may contain an Ni salt, a salt of an alkaline earth element such as Ca, Ba, or Sr, a Cr salt, a Zn salt, etc., and by selecting these salts appropriately the particle shape (axial ratio), etc. can be adjusted.

As the ferrous salt, ferrous chloride, ferrous sulfate, etc. are preferable. As the alkali, sodium hydroxide, aqueous ammonia, ammonium carbonate, sodium carbonate, etc. are preferable. With regard to salts that can be present at the same time, chlorides such as nickel chloride, calcium chloride, barium chloride, strontium chloride, chromium chloride, and zinc chloride are preferable.

In a case where cobalt is subsequently introduced into the iron, before introducing yttrium, an aqueous solution of a cobalt compound such as cobalt sulfate or cobalt chloride is mixed and stirred with a slurry of the above-mentioned iron oxyhydroxide. After the slurry of iron oxyhydroxide containing cobalt is prepared, an aqueous solution containing a yttrium compound is added to this slurry, and they are stirred and mixed.

Neodymium, samarium, praseodymium, lanthanum, gadolinium, etc. can be introduced into the ferromagnetic powder of the present invention as well as yttrium. They can be introduced using a chloride such as yttrium chloride, neodymium chloride, samarium chloride, praseodymium chloride, or lanthanum chloride or a nitrate salt such as neodymium nitrate or gadolinium nitrate, and they can be used in a combination of two or more types.

Ferromagnetic Hexagonal Ferrite Powder

Another form of the ferromagnetic powder used in the magnetic recording medium of the present invention is a tabular form, and a hexagonal ferrite powder is preferably used.

Examples of the hexagonal ferrite include substitution products of barium ferrite, strontium ferrite, lead ferrite, and calcium ferrite, and Co substitution products. More specifically, magnetoplumbite type barium ferrite and strontium ferrite, magnetoplumbite type ferrite with a particle surface coated with a spinel, magnetoplumbite type barium ferrite and strontium ferrite partially containing a spinel phase, etc., can be cited. In addition to the designated atoms, an atom such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, or Nb may be included. In general, those to which Co—Ti, Co—Ti—Zr, Co—Ti—Zn, Ni—Ti—Zn, Nb—Zn—Co, Sb—Zn—Co, Nb—Zn, etc. have been added can be used. Characteristic impurities may be included depending on the starting material and the production process.

The particle size is preferably 10 to 50 nm as a hexagonal plate size, and more preferably 20 to 40 nm. When a magnetoresistive head is used for playback, the plate size is preferably equal to or less than 40 nm so as to reduce noise. It is preferable if the plate size is in such a range, since stable magnetization can be expected due to the absence of thermal fluctuations, and since noise is reduced it is suitable for high density magnetic recording.

The tabular ratio (plate size/plate thickness) is preferably 1 to 15, and more preferably 2 to 7. It is preferable if the tabular ratio is in such a range since the adequate orientation can be obtained, and noise due to inter-particle stacking decreases. The $S_{BET}$ of a powder having a particle size within this range is usually 10 to 200 m$^2$/g. The specific surface area substantially coincides with the value obtained by calculation using the plate size and the plate thickness. The crystallite size is preferably 5 to 45 nm, and more preferably 10 to 35 nm. The plate size and the plate thickness distributions are preferably as narrow as possible. Although it is difficult, the distribution can be expressed using a numerical value by randomly measuring 500 particles on a TEM photograph of the particles.

The distribution is not a regular distribution in many cases, but the standard deviation calculated with respect to the average size is σ/average size=0.1 to 2.0. In order to narrow the particle size distribution, the reaction system used for forming the particles is made as homogeneous as possible, and the particles so formed are subjected to a distribution-improving treatment. For example, a method of selectively dissolving ultrafine particles in an acid solution is also known.

The coercive force (Hc) measured for the ferromagnetic powder can be adjusted so as to be on the order of 39.8 to 398 kA/m (500 to 5,000 Oe). A higher Hc is advantageous for high-density recording, but it is restricted by the capacity of the recording head. It is usually on the order of 63.7 to 318 kA/m (800 to 4,000 Oe), but is preferably at least 119 kA/m (1,500 Oe) and at most 279 kA/m (3,500 Oe). When the saturation magnetization of the head exceeds 1.4 T, it is preferably 159 kA/m (2,000 Oe) or higher. The Hc can be controlled by the particle size (plate size, plate thickness), the type and amount of element included, the element replacement sites, the conditions used for the particle formation reaction, etc. The saturation magnetization (σs) is 40 to 80 A·m$^2$/kg (emu/g). A higher σs is preferable, but there is a tendency for it to become lower when the particles become finer. In order to improve the σs, making a composite of magnetoplumbite ferrite with spinel ferrite, selecting the types of element included and their amount, etc. are well known. It is also possible to use a W type hexagonal ferrite.

When dispersing the ferromagnetic powder, the surface of the ferromagnetic powder can be treated with a material that is compatible with a dispersing medium and the polymer. With regard to a surface-treatment agent, an inorganic or organic compound can be used. Representative examples include oxides and hydroxides of Si, Al, P, etc., and various types of silane coupling agents and various kinds of titanium coupling agents. The amount thereof is preferably 0.1% to 10% based on the ferromagnetic powder. The pH of the ferromagnetic powder is also important for dispersion. It is usually on the order of 4 to 12, and although the optimum value depends on the dispersing medium and the polymer, it is selected from on the order of 6 to 10 from the viewpoints of chemical stability and storage properties of the magnetic recording medium. The moisture contained in the ferromagnetic powder also influences the dispersion. Although the optimum value depends on the dispersing medium and the polymer, it is usually selected from 0.01% to 2.0%.

With regard to a production method for the hexagonal ferrite, there are:

glass crystallization method (1) in which barium oxide, iron oxide, a metal oxide that replaces iron, and boron oxide, etc. as glass forming materials are mixed so as to give a desired ferrite composition, then melted and rapidly cooled to give an amorphous substance, subsequently reheated, then washed and ground to give a barium ferrite crystal powder;

hydrothermal reaction method (2) in which a barium ferrite composition metal salt solution is neutralized with an alkali, and after a by-product is removed, it is heated in a liquid phase at 100° C. or higher, then washed, dried and ground to give a barium ferrite crystal powder; and co-precipitation method (3) in which a barium ferrite composition metal salt solution is neutralized with an alkali, and after a by-product is removed, it is dried and treated at 1100° C. or less, and ground to give a barium ferrite crystal powder, etc., but a hexagonal ferrite used in the present invention may be produced by any method.

Nonmagnetic Layer

The magnetic recording medium of the present invention may have a nonmagnetic layer comprising a binder and a nonmagnetic powder between a nonmagnetic support and the magnetic layer.

A resin used as a binder of the nonmagnetic layer is not particularly limited, but it is preferable to use a polyurethane resin, and more preferably a polyurethane resin having a hydroxy group in the molecule.

The nonmagnetic powder that can be used in the nonmagnetic layer may be an inorganic substance or an organic substance. It is also possible to use carbon black, etc. Examples of the inorganic substance include a metal, a metal oxide, a metal carbonate, a metal sulfate, a metal nitride, a metal carbide, and a metal sulfide.

Specific examples thereof include a titanium oxide such as titanium dioxide, cerium oxide, tin oxide, tungsten oxide, ZnO, ZrO$_2$, SiO$_2$, Cr$_2$O$_3$, α-alumina having an α-component proportion of 90% to 100%, β-alumina, γ-alumina, α-iron oxide, goethite, corundum, silicon nitride, titanium carbide, magnesium oxide, boron nitride, molybdenum disulfide, copper oxide, MgCO$_3$, CaCO$_3$, BaCO$_3$, SrCO$_3$, BaSO$_4$, silicon carbide, and titanium carbide, and they can be used singly or in a combination of two or more types. α-Iron oxide or a titanium oxide is preferable.

The form of the nonmagnetic powder may be any one of acicular, spherical, polyhedral, and tabular. The crystallite size of the nonmagnetic powder is preferably 0.004 to 1 μm, and more preferably 0.04 to 0.1 μm. It is preferable if it is in such a range, since good dispersibility and a smooth surface can be obtained.

The average particle size of these nonmagnetic powders is preferably 0.005 to 2 μm, and more preferably 0.01 to 0.2 μm. It is also possible to combine nonmagnetic powders having different average particle sizes as necessary, or widen the particle size distribution of a single nonmagnetic powder, thus producing the same effect. It is preferable if it is in such a range, since good dispersibility and a smooth surface can be obtained.

The $S_{BET}$ of the nonmagnetic powder is preferably 1 to 100 m$^2$/g, more preferably 5 to 70 m$^2$/g, and yet more preferably 10 to 65 m$^2$/g. It is preferable if the specific surface area is in the above range, since a suitable surface roughness can be obtained, and dispersion can be carried out using a desired amount of binder.

The oil absorption measured using dibutyl phthalate (DBP) (DBP oil absorption) is preferably 5 to 100 mL/100 g, more preferably 10 to 80 mL/100 g, and yet more preferably 20 to 60 mL/100 g.

The specific gravity is preferably 1 to 12, and more preferably 3 to 6.

The tap density is preferably 0.05 to 2 g/mL, and more preferably 0.2 to 1.5 g/mL. It is preferable if the tap density is in the range of 0.05 to 2 g/mL, since there is little scattering of particles, the operation is easy, and it is possible to prevent the particles from sticking to equipment.

The pH of the nonmagnetic powder is preferably 2 to 11, and particularly preferably 6 to 9. When the pH is in this range, the amount of free fatty acid does not decrease, and the coefficient of friction under high temperature and high humidity does not increase.

The water content of the nonmagnetic powder is preferably 0.1 to 5 wt %, more preferably 0.2 to 3 wt %, and yet more preferably 0.3 to 1.5 wt %. It is preferable if the water content is in the range of 0.1 to 5 wt %, since dispersion is good, and the viscosity of a dispersed coating solution becomes stable.

The ignition loss is preferably 20 wt % or less, and a small ignition loss is preferable.

When the nonmagnetic powder is an inorganic powder, the Mohs hardness thereof is preferably in the range of 4 to 10. When the Mohs hardness is in this range, it tends to be easy to guarantee durability.

The amount of stearic acid absorbed by the nonmagnetic powder is preferably 1 to 20 $\mu mol/m^2$, and more preferably 2 to 15 $\mu mol/m^2$.

The heat of wetting of the nonmagnetic powder in water at 25° C. is preferably in the range of 20 to 60 $\mu J/cm^2$ (200 to 600 $erg/cm^2$). It is possible to use a solvent that gives a heat of wetting in this range. The number of water molecules on the surface at 100° C. to 400° C. is suitably 1 to 10/100 Å. The pH at the isoelectric point in water is preferably between 3 and 9.

The surface of the nonmagnetic powder is preferably subjected to a surface treatment with $Al_2O_3$, $SiO_2$, $TiO_2$, $ZrO_2$, $SnO_2$, $Sb_2O_3$, or ZnO. In terms of dispersibility in particular, $Al_2O_3$, $SiO_2$, $TiO_2$, and $ZrO_2$ are preferable, and $Al_2O_3$, $SiO_2$, and $ZrO_2$ are more preferable. They may be used in combination or singly. Depending on the intended purpose, a surface treated layer may be obtained by co-precipitation, or a method can be employed in which the surface is firstly treated with alumina and the surface thereof is then treated with silica, or vice versa. The surface-treated layer may be formed as a porous layer depending on the intended purpose, but it is generally preferable for it to be uniform and dense.

Specific examples of the nonmagnetic powder used in the nonmagnetic layer of the present invention include Nanotite (manufactured by Showa Denko K.K.), HIT-100 and ZA-G1 (manufactured by Sumitomo Chemical Co., Ltd.), DPN-250, DPN-250BX, DPN-245, DPN-270BX, DPB-550BX, and DPN-550RX (manufactured by Toda Kogyo Corp.), titanium oxide TTO-51B, TTO-55A, TTO-55B, TTO-55C, TTO-55S, TTO-55D, SN-100, MJ-7, α-iron oxide E270, E271, and E300 (manufactured by Ishihara Sangyo Kaisha Ltd.), STT-4D, STT-30D, STT-30, and STT-65C (manufactured by Titan Kogyo Kabushiki Kaisha), MT-100S, MT-100T, MT-150W, MT-500B, MT-600B, MT-100F, and MT-500HD (manufactured by Tayca Corporation), FINEX-25, BF-1, BF-10, BF-20, and ST-M (manufactured by Sakai Chemical Industry Co., Ltd.), DEFIC-Y and DEFIC-R (manufactured by Dowa Mining Co., Ltd.), AS2BM and TiO2P25 (manufactured by Nippon Aerosil Co., Ltd.), and 100A and 500A (manufactured by Ube Industries, Ltd.), Y-LOP (manufactured by Titan Kogyo Kabushiki Kaisha), and calcined products thereof. Particularly preferred nonmagnetic powders are titanium dioxide and α-iron oxide.

By mixing carbon black with the nonmagnetic powder, the surface electrical resistance (Rs) of the nonmagnetic layer can be reduced, the light transmittance can be decreased, and a desired micro Vickers hardness can be obtained.

The micro Vickers hardness of the nonmagnetic layer is usually 25 to 60 $kg/mm^2$, and is preferably 30 to 50 $kg/mm^2$ in order to adjust the head contact. The micro Vickers hardness can be measured using a thin film hardness meter (HMA-400 manufactured by NEC Corporation) with, as an indentor tip, a triangular pyramidal diamond needle having a tip angle of 800 and a tip radius of 0.1 μm.

The light transmittance is generally standardized such that the absorption of infrared rays having a wavelength of on the order of 900 nm is 3% or less and, in the case of, for example, VHS magnetic tapes, 0.8% or less. Because of this, furnace black for rubber, thermal black for rubber, carbon black for coloring, acetylene black, etc. can be used.

The specific surface area of the carbon black used in the nonmagnetic layer of the present invention is preferably 100 to 500 $m^2/g$, and more preferably 150 to 400 $m^2/g$, and the DBP oil absorption thereof is preferably 20 to 400 mL/100 g, and more preferably 30 to 200 mL/100 g. The average particle size of the carbon black is preferably 5 to 80 nm, more preferably 10 to 50 nm, and yet more preferably 10 to 40 nm. The pH of the carbon black is preferably 2 to 10, the water content thereof is preferably 0.1% to 10%, and the tap density is preferably 0.1 to 1 g/mL.

Specific examples of the carbon black used in the present invention include BLACKPEARLS 2000, 1300, 1000, 900, 800, 880 and 700, and VULCAN XC-72 (manufactured by Cabot Corporation), #3050B, #3150B, #3250B, #3750B, #3950B, #950, #650B, #970B, #850B, and MA-600 (manufactured by Mitsubishi Chemical Corporation), CONDUCTEX SC, RAVEN 8800, 8000, 7000, 5750, 5250, 3500, 2100, 2000, 1800, 1500, 1255 and 1250 (manufactured by Columbian Carbon Co.), and Ketjen Black EC (manufactured by Akzo).

The carbon black may be surface treated using a dispersant or grafted with a resin, or part of the surface thereof may be converted into graphite. Prior to adding carbon black to a coating solution, the carbon black may be predispersed with a binder. The carbon black can be used in a range that does not exceed 50 wt % of the above-mentioned inorganic powder and in a range that does not exceed 40 wt % of the total weight of the nonmagnetic layer. These types of carbon black may be used singly or in combination. The carbon black that can be used in the nonmagnetic layer of the present invention can be selected by referring to, for example, the 'Kabon Burakku Binran' (Carbon Black Handbook) (edited by the Carbon Black Association of Japan).

It is also possible to add an organic powder to the nonmagnetic layer, depending on the intended purpose. Examples thereof include an acrylic styrene resin powder, a benzoguanamine resin powder, a melamine resin powder, and a phthalocyanine pigment, but a polyolefin resin powder, a polyester resin powder, a polyamide resin powder, a polyimide resin powder, and a polyfluoroethylene resin can also be used.

Other Additives

In the magnetic recording medium of the present invention, additives for imparting a dispersion effect, lubrication effect, antistatic effect, plasticizing effect, etc. may be included in the magnetic layer or the nonmagnetic layer.

Examples of these additives are as follows.

Molybdenum disulfide, tungsten disulfide, graphite, boron nitride, graphite fluoride, a silicone oil, a polar group-containing silicone, a fatty acid-modified silicone, a fluorine-containing silicone, a fluorine-containing alcohol, a fluorine-containing ester, a polyolefin, a polyglycol, a polyphenyl ether; aromatic ring-containing organic phosphonic acids such as phenylphosphonic acid, benzylphosphonic acid, phenethylphosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, tolylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, and nonylphenylphosphonic acid, and alkali metal salts thereof; alkylphosphonic acids such as octylphosphonic acid, 2-ethylhexylphosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid, and isoeicosylphosphonic acid, and alkali metal salts thereof.

Aromatic phosphates such as phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate, tolyl phosphate, xylyl phosphate, ethylphenyl phosphate, cumenyl phosphate, propylphenyl phosphate, butylphenyl phosphate, heptylphenyl phosphate, octylphenyl phosphate, and nonylphenyl phosphate, and alkali metal salts thereof; alkyl phosphates such as octyl phosphate, 2-ethylhexyl phosphate, isooctyl phosphate, isononyl phosphate, isodecyl phosphate, isoundecyl phosphate, isododecyl phosphate, isohexadecyl phosphate, isooctadecyl phosphate, and isoeicosyl phosphate, and alkali metal salts thereof.

Alkyl sulfonates and alkali metal salts thereof; fluorine-containing alkyl sulfates and alkali metal salts thereof; monobasic fatty acids that have 10 to 24 carbons, may contain an unsaturated bond, and may be branched, such as lauric acid, myristic acid, palmitic acid, stearic acid, behenic acid, oleic acid, linoleic acid, linolenic acid, elaidic acid, and erucic acid, and metal salts thereof; mono-fatty acid esters, di-fatty acid esters, and poly-fatty acid esters such as butyl stearate, octyl stearate, amyl stearate, isooctyl stearate, octyl myristate, butyl laurate, butoxyethyl stearate, anhydrosorbitan monostearate, anhydrosorbitan distearate, and anhydrosorbitan tristearate that are formed from a monobasic fatty acid that has 10 to 24 carbons, may contain an unsaturated bond, and may be branched, and any one of a mono- to hexa-hydric alcohol that has 2 to 22 carbons, may contain an unsaturated bond, and may be branched, an alkoxy alcohol that has 12 to 22 carbons, may have an unsaturated bond, and may be branched, and a mono alkyl ether of an alkylene oxide polymer; fatty acid amides having 2 to 22 carbons; aliphatic amines having 8 to 22 carbons; etc. Other than the above-mentioned hydrocarbon groups, those having an alkyl, aryl, or aralkyl group that is substituted with a group other than a hydrocarbon group, such as a nitro group, F, Cl, Br, or a halogen-containing hydrocarbon such as $CF_3$, $CCl_3$, or $CBr_3$ can also be used.

Furthermore, there are a nonionic surfactant such as an alkylene oxide type, a glycerol type, a glycidol type, or an alkylphenol-ethylene oxide adduct; a cationic surfactant such as a cyclic amine, an ester amide, a quaternary ammonium salt, a hydantoin derivative, a heterocyclic compound, a phosphonium salt, or a sulfonium salt; an anionic surfactant containing an acidic group such as a carboxylic acid, a sulfonic acid or a sulfate ester group; and an amphoteric surfactant such as an amino acid, an aminosulfonic acid, a sulfate ester, or a phosphate ester of an amino alcohol, or an alkylbetaine. Details of these surfactants are described in 'Kaimenkasseizai Binran' (Surfactant Handbook) (published by Sangyo Tosho Publishing). These lubricants, antistatic agents, etc. need not always be pure and may contain, in addition to the main component, an impurity such as an isomer, an unreacted material, a by-product, a decomposition product, or an oxide. However, the impurity content is preferably 30 wt % or less, and more preferably 10 wt % or less.

Specific examples of these additives include NAA-102, hardened castor oil fatty acid, NAA-42, Cation SA, Nymeen L-201, Nonion E-208, Anon BF, and Anon LG, (produced by Nippon Oil & Fats Co., Ltd.); FAL-205, and FAL-123 (produced by Takemoto Oil & Fat Co., Ltd); Enujelv OL (produced by New Japan Chemical Co., Ltd.); TA-3 (produced by Shin-Etsu Chemical. Industry Co., Ltd.); Armide P (produced by Lion Armour); Duomin TDO (produced by Lion Corporation); BA-41G (produced by The Nisshin Oil Mills, Ltd.); and Profan 2012E, Newpol PE 61, and Ionet MS-400 (produced by Sanyo Chemical Industries, Ltd.).

The type and the amount of the dispersant, lubricant, and surfactant used in the present invention can be changed as necessary in the nonmagnetic layer and the magnetic layer. For example, although not limited to only the examples illustrated here, the dispersant has the property of adsorbing or bonding via its polar group, and it is surmised that the dispersant adsorbs or bonds, via the polar group, to mainly the surface of the ferromagnetic powder in the magnetic layer and mainly the surface of the nonmagnetic powder in the nonmagnetic layer, and once adsorbed it is hard to desorb an organophosphorus compound from the surface of a metal, a metal compound, etc. Therefore, since in the present invention the surface of the ferromagnetic powder or the surface of the nonmagnetic powder are in a state in which they are covered with an alkyl group, an aromatic group, etc., the affinity of the ferromagnetic powder or the nonmagnetic powder toward the binder resin component increases and, furthermore, the dispersion stability of the ferromagnetic powder or the nonmagnetic powder is also improved. With regard to the lubricant, since it is present in a free state, its exudation to the surface is controlled by using fatty acids having different melting points for the nonmagnetic layer and the magnetic layer or by using esters having different boiling points or polarity. The coating stability can be improved by regulating the amount of surfactant added, and the lubrication effect can be improved by increasing the amount of lubricant added to the nonmagnetic layer.

All or a part of the additives used in the present invention may be added to a magnetic coating solution or a nonmagnetic coating solution at any stage of its preparation. For example, the additives may be blended with a ferromagnetic powder prior to a kneading step, they may be added in a step of kneading a ferromagnetic powder, a binder, and a solvent, they may be added in a dispersing step, they may be added after dispersion, or they may be added immediately prior to coating.

An organic solvent used for the magnetic layer or the nonmagnetic layer of the present invention can be a known organic solvent. As the organic solvent, tetrahydrofuran, a ketone such as acetone, methyl ethyl ketone, methyl isobutyl ketone, diisobutyl ketone, cyclohexanone, or isophorone, an alcohol such as methanol, ethanol, propanol, butanol, isobutyl alcohol, isopropyl alcohol, or methylcyclohexanol, an ester such as methyl acetate, butyl acetate, isobutyl acetate, isopropyl acetate, ethyl lactate, or glycol acetate, a glycol ether such as glycol dimethyl ether, glycol monoethyl ether, or dioxane, an aromatic hydrocarbon such as benzene, toluene, xylene, cresol, or chlorobenzene, a chlorohydrocarbon such as methylene chloride, ethylene chloride, carbon tetrachloride, chloroform, ethylene chlorohydrin, or dichlorobenzene, N,N-dimethylformamide, hexane, etc. can be used at any ratio.

These organic solvents do not always need to be 100% pure, and may contain an impurity such as an isomer, an unreacted compound, a by-product, a decomposition product, an oxide, or moisture in addition to the main component. The content of these impurities is preferably 30% or less, and more preferably 10% or less. The organic solvent used in the present invention is preferably the same type for both the magnetic layer and the nonmagnetic layer. However, the amount added may be varied. The coating stability is improved by using a high surface tension solvent (cyclohexanone, dioxane, etc.) for the nonmagnetic layer; more specifically, it is important that the arithmetic mean value of the surface tension of the magnetic layer solvent composition is not less than that for the surface tension of the nonmagnetic layer solvent composition. In order to improve the dispersibility, it is preferable for the polarity to be somewhat strong, and the solvent composition preferably contains 50% or more of a solvent having a permittivity of 15 or higher. The solubility parameter is preferably 8 to 11.

Support

In the magnetic recording medium of the present invention, the nonmagnetic layer or the magnetic layer is formed by coating a nonmagnetic support with a coating solution prepared using the above-mentioned materials.

With regard to the nonmagnetic support that can be used in the present invention, known biaxially stretched films such as polyethylene naphthalate, polyethylene terephthalate, polyamide, polyimide, polyamideimide, aromatic polyamide, and polybenzoxazole can be used. Polyethylene naphthalate and aromatic polyamide are preferred. These nonmagnetic supports can be subjected in advance to a corona discharge treatment, a plasma treatment, a treatment for enhancing adhesion, a thermal treatment, etc.

The nonmagnetic support that can be used in the present invention preferably has a surface having excellent smoothness such that its center line average surface roughness is in the range of 0.1 to 20 nm, and preferably 1 to 10 nm, for a cutoff value of 0.25 mm. Furthermore, these nonmagnetic supports preferably have not only a small center line average surface roughness but also no coarse projections with a height of 1 µm or greater.

The arithmetic average roughness (Ra) of the treated nonmagnetic support is preferably 0.1 µm or less [JIS B0660-1998, ISO 4287-1997] since a magnetic recording medium obtained therefrom has a low level of noise.

A preferred thickness of the nonmagnetic support of the magnetic recording medium of the present invention is 3 to 80 µm.

Backcoat Layer

A backcoat layer (backing layer) may be provided on the side of the nonmagnetic support used in the present invention that is not coated with a magnetic coating solution. The backcoat layer is a layer provided by applying, on the side of the nonmagnetic support that is not coated with the magnetic coating solution, a backcoat layer-forming coating solution in which particulate components such as an abrasive or an antistatic agent and a binder are dispersed in an organic solvent. As the particulate components, various inorganic pigments or carbon black can be used, and as the binder, resins such as nitrocellulose, a phenoxy resin, or polyurethane can be used singly or as a mixture thereof. An adhesive layer may be provided on the side of the nonmagnetic support of the present invention that is coated with the magnetic coating solution or the backcoat layer-forming coating solution.

Undercoat Layer

In the magnetic recording medium of the present invention, an undercoat layer can be provided. Providing the undercoat layer enables the adhesion between the support and the magnetic layer or the nonmagnetic layer to be improved. A solvent-soluble polyester resin may be used in the undercoat layer. The thickness of the undercoat layer is 0.5 µm or less.

Smoothing Layer

The magnetic recording medium of the present invention may be provided with a smoothing layer. The smoothing layer referred to here is a layer for burying projections on the surface of the nonmagnetic support; it is provided between the nonmagnetic support and the magnetic layer when the magnetic recording medium is provided with the magnetic layer on the nonmagnetic support, and it is provided between the nonmagnetic support and the nonmagnetic layer when the magnetic recording medium is provided with the nonmagnetic layer and the magnetic layer in that order on the nonmagnetic support.

The smoothing layer can be formed by curing a radiation curable compound by exposure to radiation. The radiation curable compound referred to here is a compound having the property of polymerizing or crosslinking when irradiated with radiation such as ultraviolet rays or an electron beam, thus increasing the molecular weight and carrying out curing.

Production Method

A process for producing a magnetic layer coating solution for the magnetic recording medium used in the present invention comprises at least a kneading step, a dispersing step and, optionally, a blending step that is carried out prior to and/or subsequent to the above-mentioned steps. Each of these steps may be composed of two or more separate stages. All materials, including the ferromagnetic powder (the ferromagnetic hexagonal ferrite powder, the ferromagnetic metal powder), the nonmagnetic powder, the binder, the carbon black, the abrasive, the antistatic agent, the lubricant, and the solvent used in the present invention may be added in any step from the beginning or during the course of the step. The addition of each material may be divided across two or more steps.

In the process for producing the magnetic recording medium of the present invention, when preparing the magnetic coating solution, which is a coating solution for the magnetic layer, at least one magnetic coating solution is prepared in which a ferromagnetic powder is dispersed in a binder solution containing polyurethane resin. When preparing this magnetic coating solution, a kneading step is employed in which the ferromagnetic powder and polyurethane resin, as all or part of the binder for the magnetic layer, are kneaded. In the kneading step, it is preferable to use a conventionally known powerful kneading machine such as an open kneader, a continuous kneader, a pressure kneader, or an extruder. When such a kneader is used, all or part of the binder (preferably 30 wt % or more of the entire binder) is preferably kneaded with the ferromagnetic powder. The proportion of the binder added is preferably 10 to 500 parts by weight relative to 100 parts by weight of the ferromagnetic powder. Details of these kneading treatments are described in JP-A-1-106338 and JP-A-1-79274.

A dispersing step is carried out subsequent to the kneading step. A coating solvent is added to the mixture of the ferromagnetic powder and the binder obtained in the kneading step, and the ferromagnetic powder is completely dispersed in the binder solution using a sand mill, etc. In order to disperse the magnetic layer coating solution or a nonmagnetic layer coating solution, glass beads may be used. As such glass beads, a dispersing medium having a high specific gravity such as zirconia beads, titania beads, or steel beads is suitably used. An optimal particle size and packing ratio of these dispersing media is used. A known disperser such as a sand mill may be used.

With regard to a method for coating the nonmagnetic support with the magnetic coating solution, for example, the surface of a moving nonmagnetic support is coated with a magnetic layer coating solution so as to give a predetermined coating thickness. A plurality of magnetic layer coating solutions can be applied successively or simultaneously in multilayer coating, and a nonmagnetic layer coating solution and a magnetic layer coating solution can also be applied successively or simultaneously in multilayer coating. As coating equipment for applying the above-mentioned magnetic coating solution or the lower layer coating solution, an air doctor coater, a blade coater, a rod coater, an extrusion coater, an air knife coater, a squeegee coater, a dip coater, a reverse roll coater, a transfer roll coater, a gravure coater, a kiss coater, a cast coater, a spray coater, a spin coater, etc. can be used.

With regard to these, for example, 'Saishin Kotingu Gijutsu' (Latest Coating Technology) (May 31, 1983) published by Sogo Gijutsu Center can be referred to. As examples of the coating equipment and the coating method for the magnetic recording medium of the present invention, the following can be proposed.

(1) A lower layer is firstly applied by coating equipment such as gravure, roll, blade, or extrusion coating equipment, which is generally used for coating with a magnetic coating solution, and before the lower layer has dried an upper layer is applied by a pressurized support type extrusion coating device such as one disclosed in JP-B-1-46186, JP-A-60-238179, or JP-A-2-265672 (JP-B denotes a Japanese examined patent application publication).

(2) Upper and lower layers are substantially simultaneously applied by means of one coating head having two slits for a coating solution to pass through, such as one disclosed in JP-A-63-88080, JP-A-2-17971, or JP-A-2-265672.

(3) Upper and lower layers are substantially simultaneously applied by means of an extrusion coating device with a backup roll, such as one disclosed in JP-A-2-174965.

The thickness of the magnetic layer of the magnetic recording medium of the present invention is optimized according to the head saturation magnetization, the head gap, and the bandwidth of the recording signal, and is generally 0.01 to 0.10 μm, preferably 0.02 to 0.08 μm, and more preferably 0.03 to 0.08 μm. The magnetic layer can be divided into two or more layers having different magnetic properties, and the configuration of a known multilayer magnetic layer can be employed.

When a nonmagnetic layer is provided in the present invention, the thickness thereof is preferably 0.2 to 3.0 μm, more preferably 0.3 to 2.5 μm, and yet more preferably 0.4 to 2.0 μm. The nonmagnetic layer of the magnetic recording medium of the present invention exhibits its effect as long as it is substantially nonmagnetic, but even if it contains a small amount of a ferromagnetic powder as an impurity or intentionally, if the effects of the present invention are exhibited, the constitution can be considered to be substantially the same as that of the magnetic recording medium of the present invention. 'Substantially the same' referred to here means that the nonmagnetic layer has a residual magnetic flux density of 10 mT (100 G) or less or a coercive force of 7.96 kA/m (100 Oe) or less, and preferably has no residual magnetic flux density and no coercive force.

The polyurethane resin may be used as all or part of the binder of the nonmagnetic layer. It is preferable to use it as all of the binder of the nonmagnetic layer.

In the present invention, it is preferable to provide the lower layer containing the inorganic powder on the support in order to apply the magnetic layer stably, and to apply the magnetic layer by a wet-on-wet method.

In the case of a magnetic tape, the coated layer of the magnetic layer coating solution is subjected to a magnetic field alignment treatment in which the ferromagnetic powder contained in the coated layer of the magnetic layer coating solution is aligned in the longitudinal direction using a cobalt magnet or a solenoid. In the case of a disk, although sufficient isotropic alignment can sometimes be obtained without using an alignment device, it is preferable to employ a known random alignment device such as, for example, arranging obliquely alternating cobalt magnets or applying an alternating magnetic field with a solenoid. The isotropic alignment referred to here means that, in the case of a ferromagnetic metal powder, in general, in-plane two-dimensional random is preferable, but it can be three-dimensional random by introducing a vertical component. In the case of a ferromagnetic hexagonal ferrite powder, in general, it tends to be in-plane and vertical three-dimensional random, but in-plane two-dimensional random is also possible. By using a known method such as magnets having different poles facing each other so as to make vertical alignment, circumferentially isotropic magnetic properties can be introduced. In particular, when carrying out high density recording, vertical alignment is preferable. Furthermore, circumferential alignment may be employed using spin coating.

It is preferable for the drying position for the coating to be controlled by controlling the drying temperature and blowing rate and the coating speed; it is preferable for the coating speed to be 20 m/min to 1,000 m/min and the temperature of drying air to be 60° C. or higher. An appropriate level of pre-drying may be carried out prior to entering a magnet zone.

After drying is carried out, the coated layer is subjected to a surface smoothing treatment. The surface smoothing treatment employs, for example, super calender rolls, etc. By carrying out the surface smoothing treatment, cavities formed by removal of the solvent during drying are eliminated, thereby increasing the packing ratio of the ferromagnetic powder in the magnetic layer, and a magnetic recording medium having high electromagnetic conversion characteristics can thus be obtained.

With regard to calendering rolls, rolls of a heat-resistant plastic such as epoxy, polyimide, polyamide, or polyamide-imide are used. It is also possible to treat with metal rolls.

The magnetic recording medium of the present invention preferably has a surface center line average roughness in the range of 0.1 to 4 nm for a cutoff value of 0.25 mm, and more preferably 1 to 3 nm, which is extremely smooth. As a method therefor, a magnetic layer formed by selecting a specific ferromagnetic powder and binder as described above is subjected to the above-mentioned calendering treatment.

The calender roll temperature is preferably in the range of 60° C. to 100° C., more preferably in the range of 70° C. to 100° C., and yet more preferably in the range of 80° C. to 100° C. The calender roll pressure is preferably in the range of 100 to 500 kg/cm, more preferably in the range of 200 to 450 kg/cm, and yet more preferably in the range of 300 to 400 kg/cm. The magnetic recording medium thus obtained can be cut to a desired size using a cutter, etc. before use.

In accordance with the magnetic recording medium of the present invention, the smoothness of the magnetic layer improves, and the electromagnetic conversion characteristics can be improved. Furthermore, high smoothness and durability can be achieved at the same time.

EXAMPLES

The present invention is explained in detail below by reference to Examples, but these Examples should not be construed as limiting the present invention.

In the explanation below, 'parts' means 'parts by weight'.

Measurement methods

1. Magnetic Layer Surface Roughness Ra

The center line average surface roughness Ra for a cutoff value of 0.25 mm was obtained by an optical interference method using a digital optical profiler (manufactured by WYKO).

2. Magnetic Layer Surface Projections

The number of projections having a microprojection height of 10 to 20 nm per 10 μm square (100 (μm)$^2$) was measured using a Nanoscope III (AFM: atomic force microscope) manufactured by Digital Instruments with a four-sided pyramidal SiN probe having a tip angle of 70°.

3. Electromagnetic Conversion Characteristics

A single frequency signal at 4.7 MHz was recorded using a DDS3 drive at an optimum recording current, and the playback output was measured. The playback output of the Examples was expressed as a value relative to 0 dB for the playback output of Comparative Example 1.

4. Durability

Tape was made to slide repeatedly for 5,000 passes at 40° C. and 80% against an SUS guide pole used in a DDS3 drive with the magnetic layer surface in contact with the guide pole while applying a load of 100 g (T1) and pulling with a tension (T2) that gave 14 mm/sec.

An increase in frictional coefficient during this process was expressed as μ(5,000 passes)/μ (1 pass).

The tape damage after 5,000 passes was evaluated using the ranking below.

Excellent: some scratches, but more areas in which there were no scratches.

Good: more scratched areas than unscratched areas.

Poor: magnetic layer completely peeled off.

Example 1

Preparation of Magnetic Solution for Magnetic Layer 100 parts of a ferromagnetic alloy powder A (composition: Co 20%, Al 9%, and Y 6 atm % relative to Fe 100 atm %; Hc 175 kA/m (2,209 Oe); crystallite size 11 nm; BET specific surface area 70 m$^2$/g; major axis length 45 nm; σs 111 A·m$^2$/kg (emu/g)) was ground in an open kneader for 10 minutes, and then kneaded for 60 minutes with

| | |
|---|---|
| 30% cyclohexanone solution of compound (a) (R in Formulae (I) is methyl) | 20 parts |
| 30% cyclohexanone solution of vinyl chloride copolymer MR110 (manufactured by Zeon Corporation) | 20 parts, and |
| 30% methyl ethyl ketone (MEK)/toluene = 1/1 solution of a polyurethane resin (UR8200, manufactured by Toyobo Co., Ltd.) | 20 parts. |
| Subsequently, | |
| α-alumina HIT55 (manufactured by Sumitomo Chemical Co., Ltd.) | 10 parts |
| carbon black #50 (manufactured by Asahi Carbon) | 3 parts, and |
| methyl ethyl ketone/toluene = 1/1 | 200 parts |
| were added, and the mixture was dispersed in a sand mill for 120 minutes. | |
| To this were added | |
| 30% MEK/toluene = 1/1 solution of a polyisocyanate (Coronate 3041, manufactured by Nippon Polyurethane Industry Co., Ltd.) | 15 parts |
| stearic acid | 1 part |
| myristic acid | 1 part |
| isohexadecyl stearate | 3 parts, and |
| MEK | 100 parts | and after stirring the mixture for a further 20 minutes, it was filtered using a filter having an average pore size of 1 μm to give a magnetic coating solution.

Preparation of Nonmagnetic Coating Solution for Lower Layer 85 parts of acicular α-iron oxide (major axis length 100 nm; alumina surface treatment layer; $S_{BET}$ 52 m$^2$/g; pH 9.4) and 15 parts of Ketjen black EC carbon black (manufactured by Nippon EC) were ground in an open kneader for 10 minutes, and then kneaded for 60 minutes with

| | |
|---|---|
| 30% cyclohexanone solution of vinyl chloride copolymer MR110 (manufactured by Zeon Corporation) | 60 parts |
| 30% MEK/toluene = 1/1 solution of polyurethane resin UR8200 (manufactured by Toyobo Co., Ltd.) | 60 parts, and |
| cyclohexanone | 20 parts |
| Subsequently, | 200 parts |
| methyl ethyl ketone/cyclohexanone = 6/4 was added, and the mixture was dispersed in a sand mill for 120 minutes. | |
| To this were added | 15 parts |
| 30% MEK/toluene = 1/1 solution of a polyisocyanate (Coronate 3041 manufactured by Nippon Polyurethane Industry Co., Ltd.) | |
| stearic acid | 1 part |
| myristic acid | 1 part |
| isooctyl stearate | 3 parts, and |
| MEK | 50 parts | and after stirring the mixture for a further 20 minutes, it was filtered using a filter having an average pore size of 1 μm to give a nonmagnetic coating solution.

A surface of a 6.0 μm thick polyethylene naphthalate support was subjected to simultaneous multilayer coating with the nonmagnetic coating solution so obtained at 1.2 μm and immediately after that with the magnetic coating solution at a dry thickness of 0.1 μm. Before the magnetic coating solution had dried, it was subjected to magnetic field alignment using a 5,000 G Co magnet and a 4,000 G solenoid magnet, and the coating was then subjected to a calender treatment employing a metal roll-metal roll-metal roll-metal roll-metal roll-metal roll-metal roll combination (speed 100 m/min, line pressure 300 kg/cm, temperature 90° C.), then subjected to a thermal treatment at 50° C. for 7 days, and slit to a width of 3.8 mm to give a magnetic tape.

Example 2

A magnetic tape was prepared in the same manner as in Example 1 except that compound (b) (R in Formulae (I) is ethyl) was used instead of compound (a) used in the magnetic coating solution of Example 1.

Example 3

A magnetic tape was prepared in the same manner as in Example 1 except that compound (c) (R in Formulae (I) is propyl) was used instead of compound (a) used in the magnetic coating solution of Example 1.

Example 4

A magnetic tape was prepared in the same manner as in Example 1 except that compound (d) (R in Formulae (II) is methyl) was used instead of compound (a) used in the magnetic coating solution of Example 1.

Example 5

A magnetic tape was prepared in the same manner as in Example 1 except that compound (e) (R in Formulae (III) is methyl) was used instead of compound (a) used in the magnetic coating solution of Example 1.

Comparative Example 1

A magnetic tape was prepared in the same manner as in Example 1 except that compound (a) was not added to the magnetic coating solution in Example 1.

Comparative Example 2

A magnetic tape was prepared in the same manner as in Example 1 except that citric acid was used instead of compound (a) used in the magnetic coating solution of Example 1.

Example 6

A magnetic tape was prepared in the same manner as in Example 1 except that 60 parts of a 30% cyclohexanone solution of compound (a) was used instead of 60 parts of the solution of vinyl chloride copolymer MR110 in the nonmagnetic solution for the lower layer.

The magnetic layer surface roughness Ra, magnetic layer surface projections, electromagnetic conversion characteristics, and durability (increase in frictional coefficient and damage to the tape) of the magnetic tapes thus prepared were evaluated. The results obtained are given in Table 1.

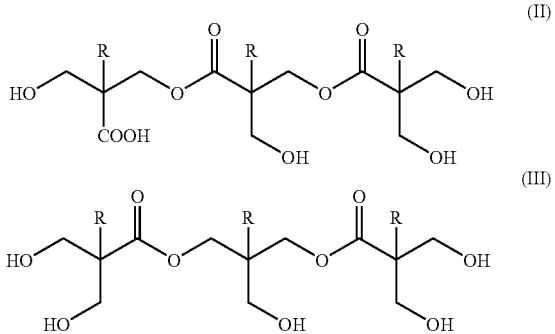

(in Formulae (I) to (III), each R independently denotes an alkyl group having 1 to 20 carbons), wherein the magnetic layer comprises 0.1 to 15 parts by weight of at least one type of compound selected from Formulae (I) to (III) relative to 100 parts by weight of ferromagnetic powder.

2. A magnetic recording medium comprising:

a support;

a nonmagnetic layer provided on or above the support, the nonmagnetic layer comprising a nonmagnetic powder dispersed in a binder; and at least one magnetic layer provided on the nonmagnetic layer, the magnetic layer comprising a ferromagnetic powder dispersed in a binder, and the nonmagnetic layer

TABLE 1

| | Compound | | Surface roughness Ra (nm) | Micro projections Number/100 (μm)² | Electro magnetic conversion characteristics (dB) | Increase in frictional coefficient | Tape damage |
|---|---|---|---|---|---|---|---|
| | Magnetic layer | Nonmagnetic layer | | | | | |
| Ex. 1 | (a) | None | 2.8 | 65 | 2.1 | 1.5 | Excellent |
| Ex. 2 | (b) | None | 2.7 | 185 | 1.9 | 1.3 | Excellent |
| Ex. 3 | (c) | None | 2.7 | 870 | 1.4 | 1.4 | Excellent |
| Ex. 4 | (d) | None | 2.6 | 45 | 2.4 | 1.3 | Excellent |
| Ex. 5 | (e) | None | 2.6 | 60 | 2.2 | 1.3 | Excellent |
| Ex. 6 | (a) | (a) | 2.4 | 12 | 2.8 | 1.1 | Excellent |
| Comp. Ex. 1 | None | None | 3.9 | 1320 | 0 | 2.6 | Poor |
| Comp. Ex. 2 | Citric acid | None | 3.6 | 865 | 2.8 | 2.1 | Poor |

What is claimed is:

1. A magnetic recording medium comprising:

a support; and at least one magnetic layer provided on or above the support, the magnetic layer comprising a ferromagnetic powder dispersed in a binder and at least one type of compound selected from Formulae (I) to (III) below;

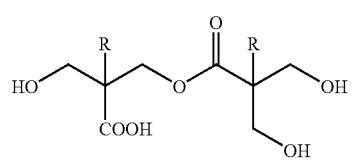

and/or the magnetic layer comprising at least one type of compound selected from Formulae (I) to (III) below;

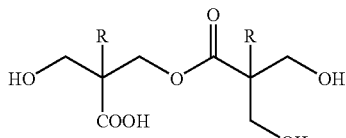

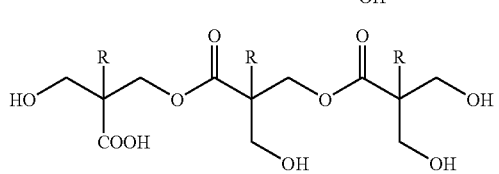

-continued

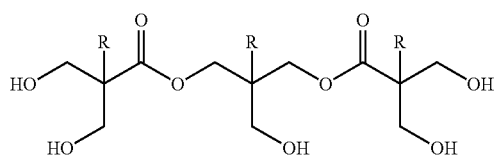 (III)

(in Formulae (I) to (III), each R independently denotes an alkyl group having 1 to 20 carbons),
wherein the magnetic layer comprises 0.1 to 15 parts by weight of at least one type of compound selected from Formulae (I) to (III) relative to 100 parts by weight of ferromagnetic powder.

3. The magnetic recording medium according to claim 1, wherein the magnetic layer comprises at least one type of compound selected from Formulae (I) to (III) below;

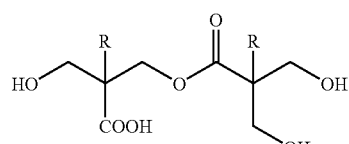 (I)

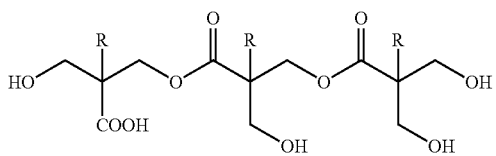 (II)

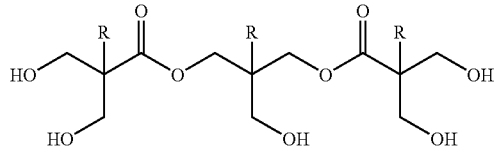 (III)

(in Formulae (I) to (III), each R independently denotes an alkyl group having 1 to 6 carbons).

4. The magnetic recording medium according to claim 2, wherein the nonmagnetic layer and/or the magnetic layer comprises at least one type of compound selected from Formulae (I) to (III) below;

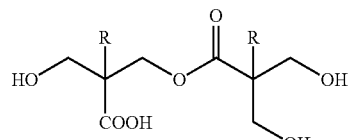 (I)

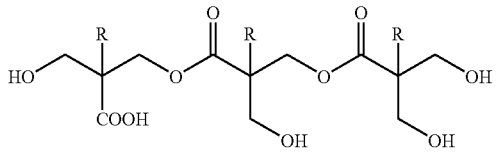 (II)

-continued

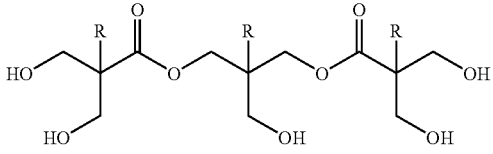 (III)

(in Formulae (I) to (III), each R independently denotes an alkyl group having 1 to 6 carbons).

5. The magnetic recording medium according to claim 1, wherein the magnetic layer comprises a compound of Formula (I) below;

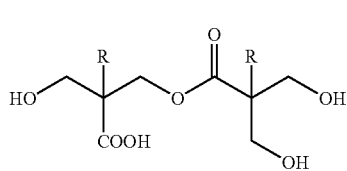 (I)

(in Formula (I), each R independently denotes methyl, ethyl, or propyl).

6. The magnetic recording medium according to claim 2, wherein the nonmagnetic layer and/or the magnetic layer comprises a compound of Formula (I) below;

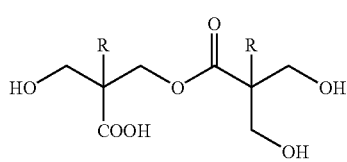 (I)

(in Formula (I), each R denotes methyl, ethyl, or propyl).

7. The magnetic recording medium according to claim 2, wherein the nonmagnetic layer comprises 0.1 to 15 parts by weight of at least one type of compound selected from Formulae (I) to (III) relative to 100 parts by weight of nonmagnetic powder.

8. The magnetic recording medium according to claim 1, wherein there are 5 to 1,000/100 ($\mu$m)$^2$ magnetic layer surface micro projections having a height of 10 to 20 nm measured by atomic force microscopy (AFM).

9. The magnetic recording medium according to claim 2, wherein there are 5 to 1,000/100 ($\mu$m)$^2$ magnetic layer surface micro projections having a height of 10 to 20 nm measured by atomic force microscopy (AFM).

10. The magnetic recording medium according to claim 1, wherein there are 5 to 100/100 ($\mu$m)$^2$ magnetic layer surface micro projections having a height of 10 to 20 nm measured by atomic force microscopy (AFM).

11. The magnetic recording medium according to claim 2, wherein there are 5 to 100/100 ($\mu$m)$^2$ magnetic layer surface micro projections having a height of 10 to 20 nm measured by atomic force microscopy (AFM).

12. The magnetic recording medium according to claim 1, wherein the binder is polyurethane.

13. The magnetic recording medium according to claim 2, wherein the binder is polyurethane.

14. The magnetic recording medium according to claim 1, wherein the ferromagnetic powder is an acicular ferromagnetic substance having a major-axis length of 25 to 60 nm or a tabular magnetic substance having a plate size of 10 to 50 nm.

15. The magnetic recording medium according to claim 2, wherein the ferromagnetic powder is an acicular ferromagnetic substance having a major axis length of 25 to 60 nm or a tabular magnetic substance having a plate size of 10 to 50 nm.

* * * * *